Feb. 2, 1926.                                                                    1,571,427
T. A. MORRIE
PISTON FOR ENGINES
Filed Oct. 14, 1922

WITNESSES
Charles H. Ourand
J. P. Smith

T. A. Morrie
INVENTOR

BY
ATTORNEY

Patented Feb. 2, 1926.

1,571,427

UNITED STATES PATENT OFFICE.

TITTISANNA ALFRED MORRIE, OF SUGARLOAF, PENNSYLVANIA.

PISTON FOR ENGINES.

Application filed October 14, 1922. Serial No. 594,571.

*To all whom it may concern:*

Be it known that I, TITTISANNA A. MORRIE, a citizen of the United States, residing at Sugarloaf, in the county of Luzerne and State of Pennsylvania, have invented a new and useful Improvement in Pistons for Engines, of which the following is a specification.

This invention relates to pistons for engines, compressors and the like, and has for its object the provision of a piston having a novel wrist pin mounting which will eliminate the holes ordinarily provided, it being well known that such holes are a great source of oil leakage.

An important and more specific object is the provision of a piston in which the wrist pin is mounted within bearing boxes detachably secured within the piston, and carrying bushings which are renewable when worn, and which are formed with flanges engaging opposite sides of the connecting rod for preventing side slap, the bearings being, moreover, provided with lubricating means.

An additional object is the provision of a piston of this character which will be simple and inexpensive in manufacture, easy to assemble and disassemble, and which in addition to the above named advantages, is capable of having worn parts replaced to avoid discarding the entire piston in case of wear.

To the attainment of the foregoing objects and advantages, the invention consists in the details of construction and arrangement to be hereinafter described and claimed, and illustrated in the accompanying drawing, it being, however, understood that the right is reserved to make changes and modifications in the structure to widen the field of utility and adaptability of the device, provided such variations constitute no departure from the salient features of the invention or the scope of the appended claims.

Figure 1:
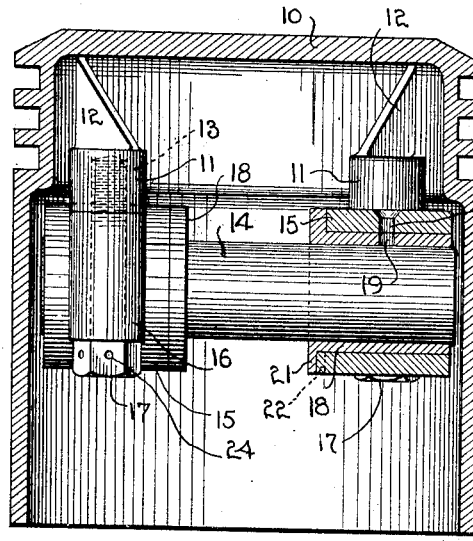
Figure 1 is a longitudinal section through the piston showing one bearing box in elevation and the other in section.
Figure 2:
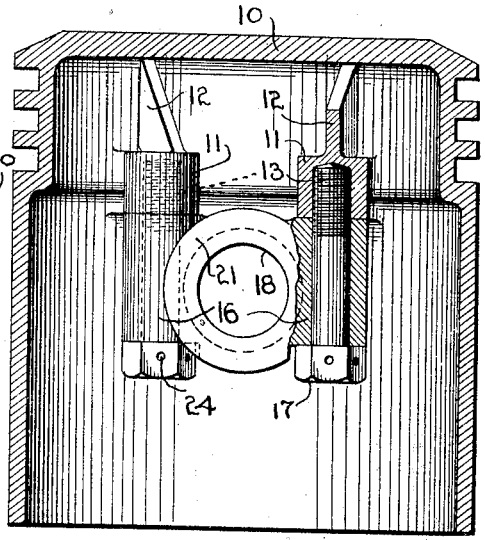
Figure 2 is a section at right angles to Figure 1, with one side of one bearing box in elevation and the other side in section.
Figure 3:
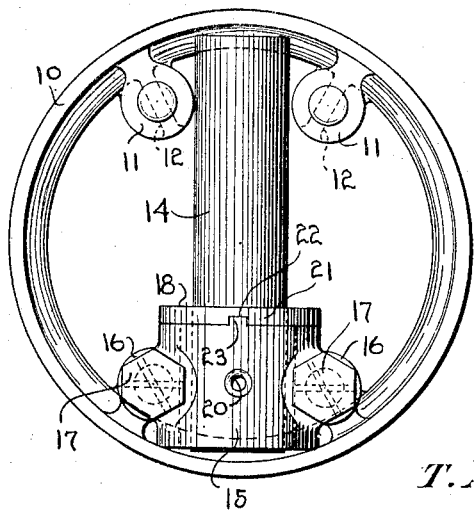
Figure 3 is a view looking into the open end of the piston and showing one bearing box and bushing in place and the other removed.

Referring more particularly to the drawings, the numeral 10 designates the piston body which is of the usual construction, and which includes the ordinary head and skirt formed with grooves for the reception of packing rings, it being noted that the skirt is solid and free from the holes which are ordinarily provided for the insertion of the wrist pin. Formed within the head portion of the piston are integral bosses 11 reinforced by integral webs 12 and formed with threaded sockets 13.

In order to mount the wrist pin 14 within the piston, I provide a pair of bearing boxes 15, formed with laterally extending ears 16 designed to register with the bosses 11, and formed with holes for the passage of studs or cap screws 17 which are screwed into the sockets 13. Within each bearing box is a bushing 18 formed with a hole 19, registering with an oil passage 20 in the top of the associated bearing box, for lubricating purposes. The inner ends of these bushings are formed with flanges 21 which are adapted to engage the opposite sides of the connecting rod, not shown, for the purpose of preventing side slap.

To prevent turning movement of the bushings within the bearing boxes, the box engaging face of each flange 21 is formed with a recess 22 receiving a projection 23 on the adjacent end or edge of the bearing box. This means for preventing rotation of the bushings within the bearing boxes is important as it will prevent the holes 19 from getting out of registration with the oil passages 20.

In assembling the parts, the bushings 18 are placed within the bearing boxes 15, and these assembled members are then slipped onto the end portions of the wrist pin 14, it being of course understood that the connecting rod is engaged upon the intermediate portion of the wrist pin. All these parts are then inserted into the piston, and the cap screws or studs 17 are screwed into the sockets 13, whereupon the parts will be firmly held in their proper position. It should be mentioned that the heads of the studs or cap screws 17 are formed with holes 24 through selected ones of which may be laced a suitable wire or wires, not shown, for securing the cap screws or studs together in pairs to prevent unscrewing thereof.

From the foregoing description and a study of the drawings, it will be apparent that I have thus provided a piston having a very efficient wrist pin mounting, which entirely eliminates the necessity for providing any holes in the skirt of the piston. Lubrication of the wrist pin within its bearings is assured, as the oil splashing will pass through the passages 20 and holes 19 and consequently lubricate the engaging surfaces of the bushings and wrist pin. In case of excessive wear, the parts may be easily disassembled and worn bushings replaced with new ones. A noticeable feature is the fact that the bushing flanges 21 will operate to prevent any side slap, and this will be conducive to smoother and quieter operation of the motor, pump or other device in which the piston is used.

What is claimed is:—

1. A piston formed internally with spaced integral bosses having threaded sockets, a pair of spaced wrist pin bearing boxes having spaced lateral ears engaged against said bosses, threaded securing members passing through said ears and into said sockets, a bushing within each bearing box, the adjacent ends of said bushings being formed with flanges adapted to bear against the opposite sides of a connecting rod mounted upon the wrist pin, whereby to prevent side slap.

2. A piston formed internally with spaced integral bosses provided with threaded openings, one pair of bosses at each side of the piston, a pair of wrist pin bearing boxes located within the piston and having spaced ears engaging against said bosses, threaded securing members passing through said ears and into said openings of the bosses, bushings located within the boxes and having their inner ends formed with flanges, which are located at each side of the connecting rod mounted on said wrist pin, so as to overcome side slap, and means for preventing rotation of the bushings within the boxes.

In testimony that I claim the foregoing as my own, I have hereto affixed my signature.

TITTISANNA ALFRED MORRIE.